Patented Mar. 12, 1940

2,192,954

UNITED STATES PATENT OFFICE 2,192,954

TRANSFER OF PIGMENT TO ORGANIC VEHICLES

Clifford K. Sloan and Gordon D. Patterson, Wilmington, Del., assignors to E. I. du Pont de Nemours & Company, Wilmington, Del., a corporation of Delaware No Drawing. Application July 22, 1936, Serial No. 91,967

17 Claims. (Cl. 134—58)

This invention relates to coating compositions and more particularly to a process for preparing coating compositions by direct transfer of a pigment from an aqueous system to an organic vehicle.

The art of preparing coating compositions by direct transfer of pigment from an aqueous to a non-aqueous phase is old. Thus, the process is well known as applied to the manufacture of white lead in oil in which a water paste of white lead is worked by agitation with linseed oil with liberation of water and resultant transfer of the originally water-wet particles of pigment to the oil phase. This method of transfer avoids the necessity of having to separate the pigment, dry it, and then of grinding the same in the organic vehicle. The successful operation of the white lead transfer or flushing process is supposedly due to the reaction of vehicle fatty acids with basic lead compounds at the surface of the pigment, thereby coating the surface of the same with a water-repellent lead soap that is preferentially wetted by oil and therefore facilitates a transfer of pigment particle from the water to the oil phase.

Unfortunately, most pigments do not respond as readily as does white lead in lending themselves to this simple process of transfer. Various attempts have been made to effect such transfer, such as by formation of a pigmented water-oil emulsion using ordinary emulsifying agents followed by breaking of the emulsion. These attempts have not been generally successful apparently because the soaps formed are not sufficiently adsorbed by the pigment particles.

This invention has as an object the improvement in processes for transferring pigments. A further object is to provide for transferring pigments from water to organic vehicle systems. Still further objects will appear in connection with the following description of the invention.

These objects are accomplished in accordance with the following invention by applying surface-active compounds that are water-soluble or attain water-solubility, the nuclei of which compounds are characterized by having a long-chain aliphatic group in the positive radical of the compound rather than in the negative radical such as is the case with ordinary soaps. Such surface-active materials having the long-chain aliphatic group in the positive radical can be classed and are referred to in the specification and claims as cation-active materials in contrast to the ordinary surface-active materials which are anion-active. This differentiation between cation-active and anion-active materials is discussed by H. Bertsch (Zeit. f. angew Chemie 48, 52 (1935)).

Among the cation-active materials used in the following invention are included all materials that are capable of furnishing in water systems positive radicals having an aliphatic chain of eight or more carbons. Included in this category are the aliphatic long-chain quaternary ammonium, long-chain sulfonium, and long-chain phosphonium compounds. These materials are used in the practice of this invention either as water-soluble salts, such as the sulfates, chlorides, bromides, etc., or in certain cases as free bases as when using the ammonium or phosphonium types of materials. Included in the types of cation-active materials operative are long-chain amines which may be of a primary, secondary, or tertiary character. Inasmuch as many of these long-chain amines are relatively insoluble in water, they may desirably be solubilized either by reaction with water-soluble acids or by introduction of hydrophilic groups such as hydroxy and carboxylic groups within the molecule. Solubilization may be accomplished either prior to use or during actual processing as hereinafter described.

Our invention consists in the addition of relatively small amounts of the above type of compounds to the water-phase of the pigment at some time prior to the stage of manufacture at which the same is otherwise ordinarily dried. The agent may conveniently be added either (1) after completion of the pigment strike but prior to washing, (2) after completion of vat washing but prior to filtration, or (3) after completion of filter press washing but prior to drying. This treatment permits incorporation of the pigment into an organic vehicle and avoids the ordinary processes of drying the pigment and grinding in the vehicle.

The following examples are intended to illustrate and not to limit this invention.

Example I

An iron blue pigment composed largely of ferric-ferro cyanide and known commercially as Chinese Blue is precipitated by methods well known in the art of manufacture of ferrocyanide pigments. The pigment is filter pressed and washed to remove most of the soluble material of the pigment slurry consisting largely of sulfates and sulfuric acid.

Four hundred parts of the resultant press cake containing 100 parts of iron blue pigment are treated with 12 parts of octadecyl dimethylamine hydrochloride in 100 parts of aqueous solution, the amine solution being added slowly with agitation in a mixer capable of handling the originally thick press cake material. One hundred and fifty parts of a slightly bodied linseed oil lithographic varnish known commercially as Carter's No. 1 Regular Litho Varnish are added. Mixing is continued. Clear water separates from the mixture leaving an iron blue printing ink of low water content.

Example II

A slurry of Chinese Blue prepared as indicated in Example I is treated with a cation-active material, prior to washing out of water-soluble electrolytes, as follows:

A 10 per cent solution containing 2.19 pounds of hexadecyl pyridinium bromide is added to 440 pounds of the unwashed slurry containing 17.5 pounds of iron blue pigment. The amount of agent thus corresponds to about 12½ per cent of pigment treated. Seventy pounds of raw linseed oil are then added and the mixture vigorously agitated. The treated blue pigment particles readily pass into the oil phase which results in the formation of pigmented oil clots and liberation of practically clear water containing most of the original soluble salts of the mother liquor. These salts are removed from the system by drawing off the water phase and washing the remaining ink three times, using fresh water each time. After final removal of the water, the pigment-oil mixture is stirred until smooth. The product of the foregoing process is an iron blue paint containing approximately 20 per cent of pigment in linseed oil.

Example III

An unwashed Chinese Blue slurry is treated as in Example II except that the 2.19 pounds hexadecyl pyridinium bromide is replaced by 2.6 pounds of methyl-benzyl octadecyl sulfonium methyl sulfate, the amount of agent corresponding to about 15 per cent of the pigment treated. Transfer of pigment occurs in the same manner as indicated in Example II.

Example IV

Ten pounds of chrome orange pigment consisting essentially of basic lead chromate is treated in the form of the washed press cake in a mixer suitable for handling such plastic materials. One pound of mineral spirits is added to the pigment-water composition. Agitation of these ingredients in the mixture produces no transfer whereas the addition of 0.05 pound of hexadecyl pyridinium bromide in the form of a 10 per cent aqueous solution produces an immediate transfer of pigment to the mineral spirits phase with liberation of water.

Example V

Transfer of chrome yellow which is essentially lead chromate is brought about by the same process employed in Example IV using 10 pounds of chrome yellow in pulp form, 3.3 pounds of mineral spirits and 0.1 pound of hexadecyl pyridinium bromide in the form of a 10 per cent aqueous solution. Immediate transfer to mineral spirits is produced with liberation of water.

Example VI

A printing ink containing maroon toner commercially known as Lake Bordeaux B is made by transfer of the above pigment from the aqueous paste form directly to a lithographic varnish, a slightly bodied linseed oil known commercially as Carter's No. 0 Regular. Lake Bordeaux B is a metallic salt obtained by a suitable precipitation from the dyestuff resulting from the coupling of diazotized tobias acid with beta-hydroxy-naphthoic acid. Fourteen and one half pounds of an aqueous pigment paste containing 2.5 pounds of this pigment is mixed with 2.5 pounds of the lithographic varnish in a suitable mixer giving a kneading action. Mixing in this manner gives a uniform mixture with no separation of water. To this is added 0.20 pound of hexadecyl pyridinium bromide and, after a short period of mixing, water separates and can be poured off substantially free of any color.

Example VII

To a 20 per cent aqueous paste of copper phthalocyanine known commercially as Monastral Blue containing 187 parts of the pigment (a phthalocyanine pigment which may be prepared as described in the copending applications of Heilbron, Irving, and Linstead U. S. Serial Nos. 698,216, filed November 15, 1933; 45,166 filed October 15, 1935; 79,812 filed May 14, 1936; 79,813 filed May 14, 1936; 79,814 filed May 14, 1936; and 79,815 filed May 14, 1936) is added 187 parts of mineral spirits and the mixture is thoroughly stirred in a mixer capable of giving a kneading action. Three parts of hexadecyl pyridinium bromide is then added and an immediate separation of water containing only a negligible amount of color takes place.

Example VIII

To 1400 grams of a chrome yellow aqueous paste containing 938 grams of chrome yellow pigment is added 200 grams of dibutyl phthalate. The mixture is stirred about five minutes to produce a uniform composition. Addition of 7.2 grams of octadecyl trimethyl ammonium bromide during continued mixing results in a transfer of pigment from the water to the oil phase with separation of water free from color.

Example IX

A transfer of lead chromate from an aqueous paste to an organic liquid is effected in the same manner as in Example VIII except that a 52 per cent linseed oil modified polyhydric alcohol-polycarboxylic acid resin is substituted weight for weight for the dibutyl phthalate and octadecyl betaine is substituted weight for weight for the octadecyl trimethyl ammonium bromide.

Whereas the above examples illustrate the use of relatively few cation-active materials, our invention includes the use of all such materials in effecting transfer of pigments to organic vehicles. By the term cation-active we means aliphatic compounds which in aqueous systems yield positive radicals having an alkyl or substituted alkyl chain containing at least 8 carbons.

The first species of this general class of agent consists of water-soluble salts of organic bases which bases are characterized by having at least one basic nitrogen containing residue and at least one long-chain aliphatic residue.

The first species can be divided into two groups. As an example of the first of these groups, we may use water-solubilized long-chain amine compounds of either primary, secondary, or tertiary character which may be solubilized by methods including salt formation with water-soluble inorganic acids or by formation of hydroxy or carboxy derivatives of these long-chain amines. As specific representatives of long-chain amines that can be readily solubilized by addition of acids like sulfuric, hydrochloric, etc., we may utilize dodecyl amine, hexadecyl amine, octadecyl amine, and the corresponding secondary or tertiary alkyl derivatives of the same, i. e., dodecyl dimethyl amine, didodecyl amine, octadecyl diethyl amine, etc. As representatives of long-chain amines partially or completely solubilized by relatively water polar groups, such as hydroxy or carboxy derivatives, we may utilize such materials as didodecyl amine ethanol, dodecyl diglycerol amine, dodecyl methylglucamine, esters formed from long-chain alcohols and amino acids, esters formed from fatty acids and hydroxy amines, and by ester interchange with fatty oils and hydroxy amines, etc. In certain cases it is not necessary to solubilize the agent prior to addition of the same to the water-pigment slurry. This is the case, for example, with long-chain amines, when there is sufficient free acid in the pigment slurry to react with the amine, solubilizing the same due to salt formation in process. In the use of long-chain amines, some caution must be exercised as to sensitivity of the same to electrolytes present in the pigment slurry. As an example, we find that certain long-chain amines can not be as readily used in our process if there is considerable sulfate ion present in the pigment slurry due to formation of a relatively insoluble sulfate compound before the long-chain compound can orient itself at the pigment surface. In such an event, it is necessary either to wash out the interfering electrolyte before treatment or to make use of some other cation-active material less sentitive to this electrolyte.

A second group of the first species of the above nitrogen-containing species consists of quaternary ammonium compounds containing at least one long alkyl chain containing 8 or more carbons. Representative compounds of this class include octadecyl trimethyl ammonium bromide, hexadecyl trimethyl ammonium bromide, dodecyl pyridinium sulfate, dodecyl pyridinium bromide, dodecyl pyridinium chloride, hexadecyl pyridinium bromide, octadecyl pyridinium bromide, octadecyl oxymethyl pyridinium chloride, octadecyl choline chloride, etc. Long-chain betaines such as octadecyl betaine are useful for our purpose, being related to this type of species. Even other examples of compounds of this type are given in U. S. Patent 2,004,476 disclosing the use of this species in textile treatment.

A second species of the class operative in the present invention consists of water soluble salts of organic compounds which are characterized by having at least one ternary sulfonium residue to which is attached at least one alkyl chain containing 8 or more carbons. As specific representatives of this species including compounds in which the sulfur atom has a positive valence of four are to be included: methyl benzyl stearyl sulfonium methyl sulfate, lauryl dimethyl sulfonium methyl sulfate, etc.

A third species of the class operative in the present invention includes phosphorous compounds similar in structure to the nitrogen-containing compounds described under the first species. They are water-soluble salts of organic compounds which are characterized by having at least one phosphonium residue to which is attached at least one aliphatic group containing an aliphatic residue of at least 8 carbon atoms.

It is to be understood that our invention is not limited to the pigments listed in the above examples. The invention includes the use of cation-active agents for transferring all pigments including such materials well known commercially as iron blue, chrome yellow, chrome orange, chrome green, zinc chromate, red lead, lithol red, phospho-tungstic acid toners, phthalocyanines, azo type toners, alumina hydrate, lakes, carbon black, iron oxide, zinc oxide, titanium-containing pigments, zinc sulfide-containing pigments, zinc oxide, white lead, extenders, etc.

By the term pigment we mean substances which are generally considered insoluble in the vehicle as distinguished from dyestuffs which are generally considered soluble.

Whereas the examples mentioned above disclose the transfer of pigments to certain vehicles only, the invention is not limited thereby but includes all vehicles used in the manufacture of coating compositions. Thus our invention is operative with vehicles including oils of a drying, semi-drying, and non-drying nature including linseed oil, Chinawood oil, castor oil, etc., bodied and blown oils including lithographic varnish, etc., resins of natural or synthetic origin including rosin, ester gum, phenol-aldehyde resins, polyhydric alcohol-polycarboxylic acid resins etc., solutions of cellulose derivatives including nitrocellulose, cellulose acetate, ethyl cellulose, cellulose ethers, when they are not in a fibrous, or uncolloided, or friable condition as disclosed in application Serial No. 91,965, filed July 22, 1936, by Robert T. Hucks, etc., plasticizers including dibutyl phthalate, etc., volatile thinners including mineral spirits, petroleum fractions, aromatics such as toluene, benzene, etc., alcohols such as butyl alcohol, amyl alcohol, and their esters etc. It is to be understood that any combinations of the above vehicles are included under this invention.

By the term solution of cellulose derivatives we mean liquids of more or less fluidity but not compositions which are friable.

As indicated in the hereinbefore mentioned examples, the amount of cation-active agent required varies considerably with the particular pigment-vehicle system. The amount is largely dependent on the specific surface and density of the pigment to be transferred. Thus, with relatively large particle size and dense material such as chrome orange one-half per cent of agent on a pigment basis may desirably be used to effect transfer whereas with iron blue which is precipitated as a very small particle sized material, 15 per cent may be used. These figures are not to be taken as a limiting range to be covered but are given to indicate the factors to be considered in operation of the invention. For example, certain relatively coarse pigments such as extenders, etc., can be transferred using definitely less than the one-half per cent indicated. On the other hand, certain of the very finely divided and relatively low density pigments may require as much as 20 per cent agent. Those operating this invention for a given pigment will observe an optimum range of amount of agent to use, below which transfer is incomplete and above which emulsification of oil and aqueous phases occurs. It is thus to be understood that the preferred range as to amount of agent depends largely on the pigment being used, and may be at least as low as ¼% and at least as high as 20%.

While the process is of general applicability, it will be appreciated that the choice of agent and the amount of same to be used is dependent on several factors including cost, probability of reaction with water-soluble constituents of the mother liquor with resultant decreased effectiveness, specific surface of pigment, etc.

As hereinbefore indicated, transfer of a pigment particle from an aqueous to an organic phase is believed to be facilitated by the coating of the particle with a water-repellent layer which results in preferential wetting by the organic phase. The particular advantages in the use of cation-active agents in our invention are believed to be due to high absorption of such materials by pigment surfaces, consequently these materials are believed to impart a very effective water-repellent coating to the pigment surface. Furthermore, this type of agent is usually applicable under conditions of acidity and in presence of heavy metal ions that are so often present in pigment slurries after precipitation of the same. Under these conditions, it is well established that ordinary anion-active agents tend to be precipitated before adsorption can occur at the pigment surface itself.

Thus the invention is particularly advantageous with such pigments as iron blues that have resisted attempts to transfer the same directly to organic vehicles because of lack of strong hydrophobic polarity and to presence of interfering hydrogen and iron ions in the water slurry of the same. Our invention is applicable to this type of pigment even in the freshly precipitated and oxidized slurry. Transfer to an organic vehicle from this slurry can be used to replace the several troublesome processes involved in ordinary manufacture of iron blue coating compositions including as it does filtration, washing, drying, and then grinding in the final vehicle. Even though it may often be advantageous to transfer a pigment from the precipitated slurry form, it is to be understood that the invention is also operative by application of agent at any stage prior to final drying of the pigment. Other steps at which agent can be added include during washing, filtration, and to the press cake. It is also to be understood that the agent may be added to the vehicle and then mixing same with the aqueous pigment mixture or the same may be added to a mixture of organic vehicle and aqueous pigment phase.

As other embodiments of the invention will be suggested to those skilled in the art without departing from the spirit and scope of the invention, no limitations are intended in the annexed claims, except such as are specifically expressed or are imposed by the prior art.

We claim:

1. The process of transferring a pigment from an aqueous system to an organic vehicle immiscible with water which comprises mixing a water-wet pigment with a water-immiscible organic suspension medium in the presence of a water-soluble cation-active salt of an organic compound having at least one ternary sulphonium radical and at least one long chain aliphatic radical containing at least 8 carbon atoms in chain length attached directly to the sulfur atom.

2. The process of claim 9 in which the pigment is an iron blue.

3. The process of claim 10 in which the pigment is an iron blue.

4. The process of claim 1 in which the pigment is an iron blue.

5. The process of claim 9 characterized in that the organic vehicle is a member selected from the group consisting of drying oils, plasticizers, and thinners.

6. The process of claim 1 characterized in that the organic vehicle is a member selected from the group consisting of drying oils, plasticizers, and thinners.

7. The process of claim 11 characterized in that the organic vehicle is a member selected from the group consisting of drying oils, plasticizers, and thinners.

8. The process of transferring a pigment from an aqueous system to an organic vehicle immiscible with water which comprises mixing a water-wet pigment with a water-immiscible organic vehicle in the presence of an alkyl pyridinium halide in which the alkyl radical contains 12 to 16 aliphatic carbon atoms attached directly to the nitrogen atom.

9. The process of transferring a pigment from an aqueous system to an organic vehicle immiscible with water which comprises mixing with a water-wet pigment a water-immiscible organic liquid vehicle in the presence of a water soluble cation-active agent selected from the class consisting of amines containing only one nitrogen atom, salts of amines containing only one nitrogen atom, quaternary ammonium compounds containing only one nitrogen atom, sulfonium compounds, and phosphonium compounds, said compounds containing an open chain aliphatic radical of at least 8 carbon atoms in chain length directly attached respectively to the nitrogen, sulfur and phosphorus atoms.

10. The process of transferring a pigment from an aqueous system to an organic vehicle immiscible with water which comprises, mixing a water-wet pigment with a water immiscible organic liquid vehicle in the presence of a water-soluble salt of an amine, said compound being characterized by having only one nitrogen atom and having an open chain aliphatic radical of at least 8 carbon atoms in chain length directly attached to the nitrogen atom.

11. The process of transferring a pigment from an aqueous system to an organic vehicle immiscible with water which comprises, mixing a water-wet pigment with a water immiscible organic liquid vehicle in the presence of a water-soluble salt of a quaternary ammonium compound, said compound being characterized by having only one nitrogen atom and having an open chain aliphatic radical of at least 8 carbon atoms in chain length directly attached to the nitrogen atom.

12. The process of transferring an iron blue pigment from an aqueous system to an organic vehicle immiscible with water, which comprises mixing the water-wet pigment with a water-immiscible organic liquid vehicle in the presence of a water soluble cation-active salt of a quaternary ammonium compound containing only one nitrogen atom and having at least one open chain aliphatic radical of at least 8 carbon atoms in chain length directly attached to the nitrogen atom.

13. The process of transferring a pigment from an aqueous system to an organic vehicle immiscible with water which comprises mixing with a water-wet titanium containing pigment a water immiscible organic liquid vehicle in the presence of a water-soluble salt of a long chain aliphatic monoamine containing an open chain aliphatic radical of at least 8 carbon atoms in chain length directly attached to the nitrogen atom.

14. The process of transferring a pigment from an aqueous system to an organic vehicle immiscible with water which comprises mixing with a water-wet titanium containing pigment a water immiscible organic liquid vehicle in the presence of dodecylamine hydrochloride.

15. The process of transferring a pigment from an aqueous system to an organic vehicle immiscible with water which comprises mixing with a water-wet pigment a water immiscible organic liquid vehicle in the presence of dodecylamine hydrochloride.

16. The process of transferring a pigment from an aqueous system to an organic vehicle immiscible with water which comprises mixing with a water-wet pigment a water immiscible organic liquid vehicle in the presence of hexadecyl pyridinium bromide.

17. The process of transferring a pigment from an aqueous system to an organic vehicle immiscible with water which comprises mixing with a water-wet pigment a water immiscible organic liquid vehicle in the presence of octadecyltrimethylammonium bromide.

CLIFFORD K. SLOAN.
GORDON D. PATTERSON.